United States Patent
Patrignani

[15] 3,678,774
[45] July 25, 1972

[54] TRANSMISSION DEVICE

[72] Inventor: Theo Patrignani, Paris, France

[73] Assignee: Manufacture des Machines du Haut-Rhin Corporation, Mulhouse, France

[22] Filed: Sept. 28, 1970

[21] Appl. No.: 75,814

[30] Foreign Application Priority Data

Oct. 1, 1969 France..................................6933477

[52] U.S. Cl. ..........................................................74/250 R
[51] Int. Cl. .........................................................F16g 13/02
[58] Field of Search........................74/250 R, 245 R, 245 LP

[56] References Cited

UNITED STATES PATENTS

| | | | |
|---|---|---|---|
| 3,217,553 | 11/1965 | Patrignani............................ | 74/250 R |
| 2,602,345 | 7/1952 | Braumiller............................ | 74/250 R |
| 2,905,264 | 9/1959 | Dennis.................................. | 74/250 R |
| 3,153,940 | 10/1964 | Patrignani............................ | 74/250 R |
| 3,358,524 | 12/1967 | Patrignani............................ | 74/250 R |

*Primary Examiner*—Leonard H. Gerin
*Attorney*—Arthur O. Klein

[57] ABSTRACT

A transmission device in the form of a selectively rigidified chain which can transmit substantial forces both in tension and compression. The successive links of the chain have at least two parallel main plate members connected by transverse pivot pins, each one of such plates or members presenting a projection with an active transverse forward face and an active transverse rear face, such faces being adapted to engage the active transverse rear and forward faces, respectively, of the neighboring links when the part of the chain incorporating such links is extended along a straight line. Each plate member of the links of the chain is constituted by a single plate pierced by two holes for the reception of pivot pins which connect it to the neighboring links; a first part of such plate, situated in the vicinity of one of such holes, is located in a first plane and presents in such first plane a prolongation forming the said projection. The second part of the plate, situated at the location of the other hole, is also plane, but is offset laterally from the first portion of the plate through a distance which is equal to the thickness of the plate. Successive links are connected by having the second parts of the plate members of one link telescoped within the first parts of the next adjacent link, a pivot pin extending through the aligned holes in the first and second plate members of the links.

6 Claims, 7 Drawing Figures

Inventor:
Theo PATRIGNANI
By: Arthur O. Klein
Attorney for Applicant

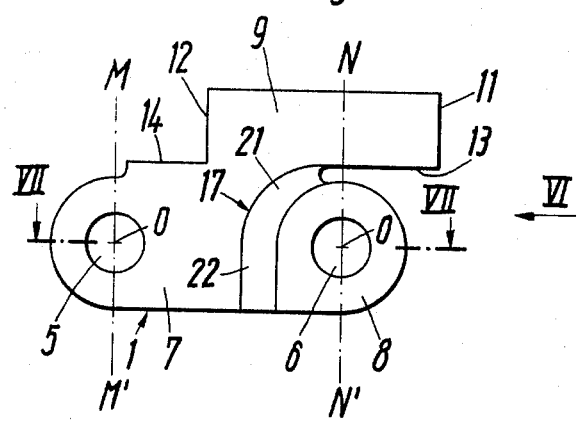
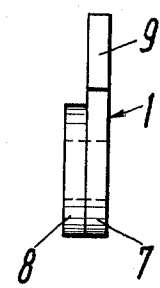
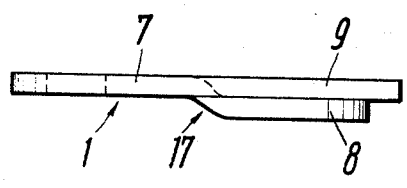
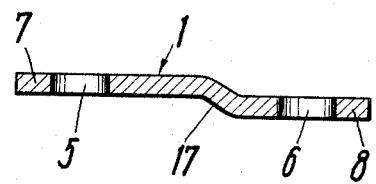

TRANSMISSION DEVICE

This invention relates to transmission mechanisms, and more specifically, to selectively rigidified chains, of the type described in my prior U.S. Pat. Nos. 3,153,940 and 3,358,524. The transmission device is constituted by a chain in which every link has a main plate member having active forward and rear transverse faces designed to have supporting engagement with the active rear and front transverse faces, respectively, of successive links when the part of the chain in which such links are incorporated is extended into a straight line.

Such a chain is capable of transmitting forces not only in tension as in classical chains, but also in a pushing direction, since when extended it, in effect, becomes a rigid bar and acts as though it were made of one piece.

In known chains of this type, the parts of the links serving to form the pivotal connections between successive links are made up by principal plates which are located alternately with one part and the other of auxiliary plates carrying the recited projections and all situated in the median plane of the corresponding part of the chain, in such manner as to be partially imprisoned between the principal plates. Such a structure is very solid and capable of transmitting very substantial forces in pushing or compression. However, in many applications, it is not necessary to construct the chain so strongly, and it is advantageous to produce a chain having a more economical structure which is capable of resisting the compressive forces to which it is subjected during use.

The object of the invention is thus to produce a chain of the type indicated which has a simpler structure and is more economically made than the previously known chains of such type.

To attain such objects, in accordance with the invention, every main plate member of each link of the chain is constituted by a single plate which is pierced by two holes which receive the pivot pins for the said link, such pivot pins connecting the link to the two next adjacent links. A first part of such plate, located in the vicinity of one of such holes is flat and presents, in its own plane, a prolongation forming the said projection, the second part of the plate, located in the vicinity of the other hole, likewise being flat. The second part of the plate is offset laterally through a distance equal to the thickness of each of such parts of the plate.

In accordance with the present invention, all of the main plate members on a given side of the chain are of the same construction. This markedly simplifies the construction of the chain and renders it much more economically made than, for example, that which is shown and claimed in applicant's prior U.S. Pat. No. 3,153,940, dated Oct. 27, 1964, wherein the portions of the links on a given side of the chain are made up of alternating main plates and auxiliary plates of different constructions. In the chain of the present invention, the confronting faces of the plate members of successive links are flat or plane, portions of the plate members of successive links being laterally offset one from the other at the zone of pivotal connection between them. Accordingly, the construction of the chain is much simpler than that shown in applicant's prior U.S. Pat. No. 3,358,524, dated Dec. 19, 1967, wherein annular projections on a plate member of one link interfit within annular grooves on the plate member of the next link to which it is pivotally connected. Such prior construction requires substantial machining of the plate members of the links, which is obviated in the chain of the present construction.

The present invention will be better understood upon consideration of the following description and examination of the annexed drawings which show a non-limiting preferred embodiment of a chain in accordance with the present invention.

In the drawings:

FIG. 4 is a view in elevation of one of the side members of the chain of FIGS. 1–3, inclusive, such side member confronting the reader in FIG. 1, the view being taken from the direction IV in FIG. 2;

FIG. 5 is a view in plan of the side member of the chain shown in FIG. 4;

FIG. 6 is a view in end elevation of the side portion of the chain shown in FIGS. 4 and 5, the view being taken in the direction VI shown in FIG. 4; and FIG. 7 is a view in horizontal section through the part of the chain shown in FIG. 4, the section being taken along line VII—VII of FIG. 4.

Figure 1:
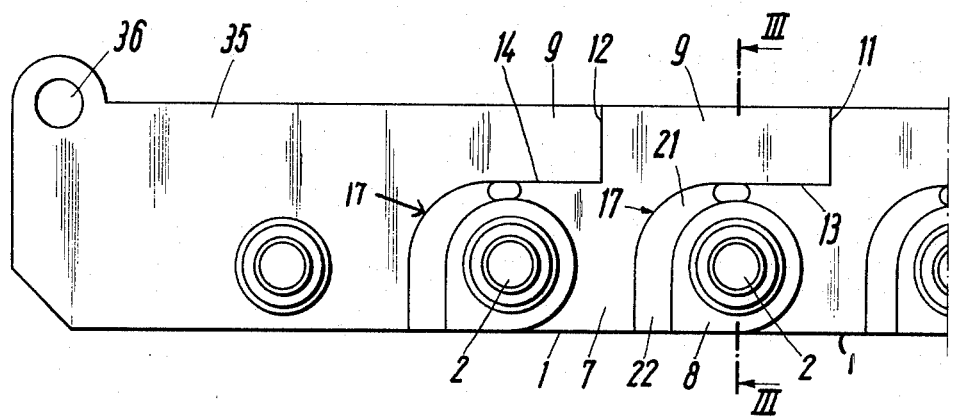
FIG. 1 is a fragmentary view in elevation of a chain in accordance with the invention.
Figure 2:
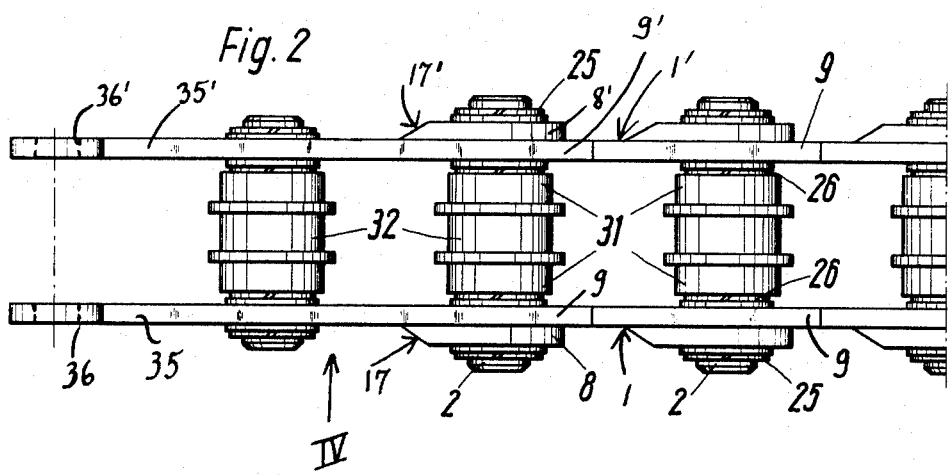
FIG. 2 is a view in plan of the portion of the chain shown in FIG. 1.
Figure 3:
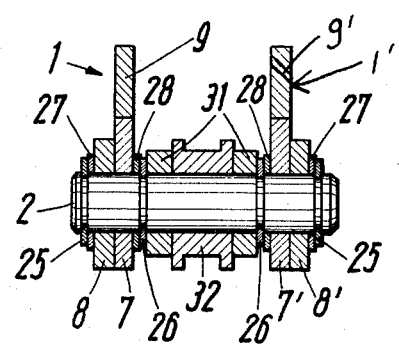
FIG. 3 is a view in transverse section through the chain of FIGS. 1 and 2 at the location of a pivot pin between successive links thereof, the section being taken along the line III—III of FIG. 1.

The chain of the present invention shown in the drawings, with the exception of the first section at the left in FIGS. 1 and 2 having side plate members 35, 35', is composed of a plurality of serially connected identical links having side plate members 1 (at the bottom in FIG. 2) and 1' (at the top in FIG. 2), the members 1 and 1' being mirror images of each other. Because of such relationship between parts 1 and 1', a specific description of part 1 will suffice. Each part 1 is made up of a single plate having a shape in outline shown in FIG. 4. Plate 1 has portions 7 and 9 of equal thickness which lie in the same plane, and an end portion 8 which is laterally offset (downwardly in FIG. 2) through a distance equal to the thickness of the plate portions 7, 9, the portion 8 lying parallel to the portions 7 and 9. In the members 1', as above-indicated, the direction of lateral offset of the part 8' is in the reverse direction from that of member 1. At one end of the member 1, adjacent the left end thereof as shown in FIG. 4, the portion 7 is pierced with a hole 5; at the other end of the member 1, in the portion 8 thereof, the member 1 is pierced with a second hole 6 of the same diameter as hole 5. When successive links of the chain are assembled as shown in FIGS. 1 to 3, inclusive, the portions 7, 7' of one link fit within the laterally offset portions 8, 8' of the next adjacent link; the links are held in such assembled position by a pivot pin or stub shaft 2 which extends through the holes 5 and 6 in the thus-assembled links.

The portion 9 of the member 1, which as above noted, lies in the plane of the portion 7 of such member, rises above the portions 7, 8 and then extends longitudinally (to the right as shown in FIG. 4). Portion 9 has a forward transverse vertical face 11, a rear transverse vertical face 12, and a lower horizontal transverse face 13 in the portion thereof wherein part 9 is separated from the part 8. To the rear of the lower end of the rear face 12 of part 9 the portion 7 has a horizontal upper face 14. The longitudinally outer ends of portions 7 and 8 of part 1 have part-circular outlines coaxial of the axes 0 of the respective holes 5, 6. When the chain is extended to lie in a straight line, as shown in FIGS. 1 and 2, the active transverse forward face 11 and the longitudinal face 13 of each projection of a link engage the rear active transverse face 12 and the longitudinal face 14 of the link immediately forward of it, so that the juxtaposed projections of all of the links form two parallel assemblies which act, upon subjection of the chain to longitudinal compressive forces, as two rigid bars.

In the embodiment shown, the second part 8 of each plate is connected to the first part 7 by an inclined portion 17 (see FIG. 7) which extends only within the interior of the zone bounded by two straight lines M, M' and N, N' (FIG. 4), perpendicular to the line connecting the centers O, O of the two holes 5, 6 in such manner as not to interfere with the pivotal movement of each link about its axis with respect to the next adjacent links.

In order to give each link the greatest rigidity possible, the zone of joining or transition portion between the two parts 7, 8 of the plate is in the form of a frustoconical formation 21 coaxial with the hole 6 of the second part of the plate, zone 21 extending substantially through 90° coaxial of the center 0 of hole 6. Such first part 21 of the transition portion extends into a vertical straight line 22 which is perpendicular to the line connecting the centers 0, 0 of holes 5, 6.

In order to provide the apparatus with the greatest strength and best functioning properties, the active transverse faces 11 and 12 of the projections of the links are located in transverse planes located near the midpoint between the centers 0, 0 of pivoting between successive links.

The first part 7 of each plate upon assembly of successive links is applied against the internal face of the second part 8 of the neighboring link, since the two parts of each plate are offset with respect to each other through a distance equal to the thickness of such plate. The projections 9, which are located in the plane of the first part of the plate, are thus themselves situated in the same longitudinal vertical plane as the portions 7 of the plate, as is clearly shown in FIGS. 2, 3, and 5.

In the example shown, each pivot pin 2 is retained by two outer spring washers or rings 25 and two inner spring washers or rings 26 which are snapped into respective annular grooves in the pivot pin 2. Washers 27 are interposed between the spring rings 25 and the outer face of the two parts 8, 8' of the plates making up the link. Washers 28 are interposed between the inner spring rings 26 and the inner faces of the first parts 7, 7' of the plates 1, 1'. Between the two inner spring rings 26 there are loosely mounted two rollers 31 between which there is mounted an idle guiding roller 32. In use, the chain passes over sprockets (not shown) upon which it is entrained, and the rollers 31 engage the valleys of the teeth on such sprockets while the guiding roller 32 rolls against a guide rail (not shown) which is designed to maintain the chain radially while the chain is subjected to compressive forces longitudinally thereof, as has been described and shown in the inventor's French patent No. 1,297,285 to which one is referred if one wishes to have details of the mounting of the chain in the further mechanism which supports and drives the chain.

In order to drive the chain by connecting it to a source of driving power, the first link at the left thereof as shown in FIGS. 1 and 2 is of special construction. Such first link is made up of two parallel plate members 35, 35' which are mirror images of each other, members 35, 35' each having an upstanding car with a hole 36, 36' therethrough by which such end link is attached to the driving mechanism (not shown). Midway of their length the members 35, 35' are provided with means for supporting rollers 31, 32 (not specifically shown) which engage the sprockets and guide rail, respectively. Parts 35, 35' are provided with upper projecting portions 9, 9' which are the same as such parts 9, 9' on members 1, 1' of the regular links. Members 35, 35' are also provided with laterally offset portions 8, 8' which are the same as those of the regular links, the first regular link having the portion 7, 7' of the parts 1, 1' thereof telescoped within the portions 9, 9' of the members 35, 35', and connected thereto by the stub shaft or axle pin 2 upon which rollers 31, 32 of the first regular link are mounted, as shown in FIGS. 1 and 2.

One will readily comprehend that in the use of the described apparatus, the chain is selectively incurved downwardly with respect to the horizontal line 0—0, or extended in a straight line. When the chain is extended in a straight line, it can transmit very large compressive forces through the intermediary of the projections 9 which act in the same manner as two parallel rigid bars. It is to be understood that the invention is not limited to the described preferred embodiment which is shown in the drawings by way of example; one may make modifications of such structure without departing from the spirit and body of the invention.

Thus, for example, the links of the chain have been shown as being made only of two plates, 1, 1' extending along the opposite longitudinal sides of the links; the links, however, may be made up of a larger number of parallel plates traversed by common pivot or stub shafts.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A selectively rigidified chain, comprising a plurality of serially connected similar links, each link having at least two parallel main plate members connected by transverse pivot pins, at least one set of such plate members which are disposed in longitudinal alignment presenting a projection with an active transverse forward face and an active transverse rear face, such faces being disposed substantially offset from the longitudinal axis of the link and being adapted to engage the active transverse rear and forward faces, respectively, of the neighboring links when the part of the chain incorporating such links is extended along a straight line, each plate member of each said set of plate members being constituted by a single plate having two longitudinally spaced holes therein for reception of the pivot pins which connect said link to the neighboring links, a first part of such plate member, situated in the zone containing one of such holes, being located in the main plane of the plate member and presenting, in such plane, a prolongation forming the said projection, while the second part of the plate member, situated in the zone containing the other hole, is also plane, but is offset laterally from the first portion of the plate member through a distance which is equal to the thickness of the plate, the first and second parts of the said link having telescopic relationships with the second and first parts, respectively, of the next adjacent links in the chain, the second part of each plate member being connected to the first part by an inclined portion.

2. A mechanism according to claim 1, wherein the inclined portion connecting the two parts of the plate member extends only to the interior of a zone bounded by two lines perpendicular to each other, one of said lines being perpendicular to the line connecting the centers of the two holes.

3. A mechanism according to claim 2, wherein the connecting portion includes a frustoconical part coaxial to the hole through the second part of the plate member and extending at least through 90° with respect to the straight line perpendicular to the line passing through the centers of the two holes.

4. A mechanism according to claim 3, wherein the frustoconical connecting part which extends through 90° is prolonged by a straight line part parallel to the line between the centers of the two holes.

5. A selectively rigidified chain, comprising a plurality of serially connected similar links, each link having at least two parallel main plate members connected by transverse pivot pins, at least one set of such plate members which are disposed in longitudinal alignment presenting a projection with an active transverse forward face and an active transverse rear face, such faces being disposed substantially offset from the longitudinal axis of the link and being adapted to engage the active transverse rear and forward faces, respectively, of the neighboring links when the part of the chain incorporating such links is extended along a straight line, each plate member of each said set of plate members being constituted by a single plate having two longitudinally spaced holes therein for reception of the pivot pins which connect said link to the neighboring links, a first part of such plate member, situated in the zone containing one of such holes, being located in the main plane of the plate member and presenting, in such plane, a prolongation forming the said projection, while the second part of the plate member, situated in the zone containing the other hole, is also plane, but is offset laterally from the first portion of the plate member through a distance which is equal to the thickness of the plate, the first and second parts of the said link having telescopic relationships with the second and first parts, respectively, of the next adjacent links in the chain, each of said plate members in each of the links being of similar construction and having similar cooperation with the plate members in the next adjacent links which are aligned therewith.

6. A mechanism according to claim 5, comprising two active forward and rear faces disposed in transverse planes disposed normal to the plane of the axes of the holes, the said active faces being disposed to engage each other at substantially the midpoint of the distance between the said two holes in the link.

* * * * *